(12) United States Patent
Celik et al.

(10) Patent No.: US 8,332,769 B2
(45) Date of Patent: *Dec. 11, 2012

(54) DIRECTIONAL FOCUS NAVIGATION

(75) Inventors: Tantek Celik, San Francisco, CA (US);
Ada Y. Chan, Sunnyvale, CA (US);
Bradley R. Pettit, San Jose, CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/784,755

(22) Filed: May 21, 2010

(65) Prior Publication Data

US 2010/0299623 A1 Nov. 25, 2010

Related U.S. Application Data

(63) Continuation of application No. 11/380,905, filed on Apr. 28, 2006, now Pat. No. 7,735,016, which is a continuation of application No. 10/293,447, filed on Nov. 13, 2002, now Pat. No. 7,134,089.

(51) Int. Cl.
*G06F 3/048* (2006.01)

(52) U.S. Cl. .......................... 715/767; 715/802; 715/858

(58) Field of Classification Search .................. 715/767, 715/858, 802
See application file for complete search history.

(56) References Cited

U.S. PATENT DOCUMENTS

| | | | |
|---|---|---|---|
| 5,510,811 A * | 4/1996 | Tobey et al. ................. | 345/157 |
| 5,548,703 A | 8/1996 | Berry et al. | |
| 5,625,763 A | 4/1997 | Cirne | |
| 5,682,511 A * | 10/1997 | Sposato et al. ................ | 715/716 |
| 5,808,604 A | 9/1998 | Robin | |
| 5,861,906 A * | 1/1999 | Dunn et al. ...................... | 725/87 |
| 6,028,600 A * | 2/2000 | Rosin et al. ................... | 715/718 |
| 6,034,689 A | 3/2000 | White et al. | |
| 6,072,485 A | 6/2000 | Barnes et al. | |
| 6,101,510 A | 8/2000 | Stone et al. | |
| 6,144,378 A * | 11/2000 | Lee ................................ | 715/767 |
| 6,154,205 A | 11/2000 | Carroll et al. | |
| 6,249,284 B1 | 6/2001 | Bogdan | |
| 6,256,030 B1 | 7/2001 | Berry et al. | |
| 6,317,144 B1 | 11/2001 | Pabla et al. | |
| 6,549,221 B1 | 4/2003 | Brown et al. | |
| 6,606,106 B1 | 8/2003 | Mendenhall et al. | |
| 6,614,457 B1 | 9/2003 | Sanada et al. | |
| 6,622,306 B1 | 9/2003 | Kamada | |
| 6,683,626 B1 * | 1/2004 | Abellera ....................... | 715/785 |
| 6,822,664 B2 | 11/2004 | Vale | |
| 6,862,598 B2 | 3/2005 | Higashigawa | |
| 6,892,360 B1 | 5/2005 | Pabla et al. | |
| 6,907,574 B2 | 6/2005 | Xu et al. | |
| 6,947,062 B2 | 9/2005 | Cuijpers et al. | |
| 6,966,037 B2 | 11/2005 | Fredriksson et al. | |
| 6,983,426 B1 * | 1/2006 | Kobayashi et al. ........... | 715/854 |
| 7,055,108 B2 | 5/2006 | Goloshubin et al. | |
| 7,240,299 B2 * | 7/2007 | Abrams ........................ | 715/857 |
| 7,788,601 B2 * | 8/2010 | Scott ............................ | 715/812 |

(Continued)

*Primary Examiner* — Andrey Belousov
*Assistant Examiner* — William Wong
(74) *Attorney, Agent, or Firm* — Lee & Hayes, PLLC

(57) ABSTRACT

A rendering engine that supports directional focus navigation, in response to a directional input, shifts the focus to an appropriate focusable element. The rendering engine determines one or more focusable elements that are candidates to receive the focus based on the received directional input and based on the relative display locations of the focusable elements. The rendering engine selects the most appropriate candidate focusable element based on each candidate element's display location in relation to the display location of the element that currently has focus.

17 Claims, 13 Drawing Sheets

U.S. PATENT DOCUMENTS

| | | |
|---|---|---|
| 2001/0017634 A1 | 8/2001 | Scott |
| 2002/0070961 A1* | 6/2002 | Xu et al. .................. 345/738 |
| 2002/0075315 A1* | 6/2002 | Scott ....................... 345/802 |
| 2002/0178142 A1 | 11/2002 | Higashigawa |
| 2003/0001907 A1* | 1/2003 | Bergsten et al. .......... 345/853 |
| 2003/0004638 A1* | 1/2003 | Villers et al. ............. 701/211 |
| 2003/0014401 A1 | 1/2003 | Goloshubin et al. |
| 2003/0028885 A1* | 2/2003 | Wilcox et al. ............. 725/60 |
| 2003/0174170 A1 | 9/2003 | Jung et al. |
| 2003/0231210 A1 | 12/2003 | Anderson et al. |
| 2003/0233652 A1 | 12/2003 | Hsieh |
| 2004/0041837 A1 | 3/2004 | Yamaguchi et al. |
| 2004/0100500 A1* | 5/2004 | Chung et al. .............. 345/767 |
| 2004/0210851 A1 | 10/2004 | Premchandran et al. |
| 2005/0086611 A1* | 4/2005 | Takabe et al. ............. 715/823 |
| 2005/0097479 A1 | 5/2005 | Takabe et al. |
| 2005/0114788 A1 | 5/2005 | Fabritius |
| 2005/0125740 A1 | 6/2005 | Clow et al. |
| 2005/0210399 A1 | 9/2005 | Filner et al. |
| 2006/0112346 A1 | 5/2006 | Miksovsky et al. |
| 2008/0222530 A1 | 9/2008 | Lakshmanan et al. |

* cited by examiner

DIRECTIONAL FOCUS NAVIGATION

RELATED APPLICATIONS

This U.S. Non-Provisional Application for Letters Patent claims the benefit of priority under 35 U.S.C. §120 as a continuation of U.S. patent application Ser. No. 11/380,905, filed Apr. 28, 2006, and titled "Directional Focus Navigation", which claims the benefit of priority to U.S. Pat. No. 7,134,089, filed Nov. 13, 2002, and titled "Directional Focus Navigation", the entire disclosure of which is hereby incorporated by reference in its entirety.

TECHNICAL FIELD

This invention relates to focus navigation and, in particular, to directional focus navigation.

BACKGROUND

A graphical user interface (GUI) may include multiple elements that can receive input. The target of the input is said to have focus, and elements eligible for focus within a document are called focusable elements. In a GUI, input that is received is processed according to an element that currently has focus. For example, if a GUI contains two editable text boxes, when a user enters text through a keyboard, the text is rendered in the text box that currently has focus.

In a GUI that receives input from a pointing device, such as a mouse, the currently focused element is determined based on the location of a cursor or pointer when a user submits a select command (e.g., clicks a mouse button). If the cursor or pointer is over a text box when the user clicks the mouse button, then that text box is given focus and future input, such as through a keyboard, is directed to the text box until the focus is moved to another element.

In a GUI that receives input from devices without pointing mechanisms, such as keyboards or remote controls, an alternative mechanism is implemented to allow a user to specify an element to be given focus, and thus, the target of keyboard (or other device) input.

Browser or other rendering engine applications that provide a mechanism for displaying documents that include focusable elements (e.g., hypertext markup language (HTML) documents, dynamic HTML documents, or web pages) are implemented to support navigation between focusable elements in a document by way of a mouse or other similar pointing device. Some such documents also support navigation through the focusable elements of the document according to a tab order that defines a sequential order that determines which element is focused next when a user presses a tab key.

Recently introduced technology allows web pages (and potentially other types of documents that may include focusable elements) to be rendered using devices other than computers. These other devices may include, but are not limited to, a television set, a cellular phone display, and a multi-modal device, such as the NOKIA 9110 Communicator. Such devices do not typically include a pointer input device, such as a mouse.

Rendering engines implemented on such devices may be programmed to receive an input that behaves like the press of a tab key to allow a user to move sequentially from one focusable element in a document to another. However, cascading style sheets, dynamic HTML, and the like support dynamic rendering of documents in such a way that the visual layout of a rendered document may differ from the layout that was intended when the document was generated and possibly, when the tab order of focusable elements in the document was established. Accordingly, moving from one focusable element to another either sequentially or based on an established tab order may not result in visually logical focus navigation, and it is desirable for a rendering engine to support directional focus navigation based on directional inputs, such as an arrow key press.

SUMMARY

Directional focus navigation is described. A browser or other rendering engine that supports directional focus navigation determines focusable elements that are candidates to receive focus based on a directional input and a display layout of the focusable elements. After candidate focusable elements are identified, the rendering engine determines the most appropriate candidate, and moves the focus to that element.

BRIEF DESCRIPTION OF THE DRAWINGS

The same numbers are used throughout the drawings to reference like features and components.

DETAILED DESCRIPTION

The following discussion is directed to directional focus navigation among focusable elements of a document. Directional focus navigation as described herein may be implemented using a browser or other interface or rendering engine that renders documents (e.g., HTML or dynamic HTML) that may contain focusable elements to provide a mechanism for navigating among those focusable elements using directional inputs (e.g., left, right, up, and down arrow keys) instead of a traditional pointing device such as a mouse. For example, directional focus navigation may be implemented to support web site navigation using a television remote control, when an HTML rendering engine is implemented as part of a television or television set-top box. In another example, directional focus navigation may be implemented to support web site navigation using a cellular telephone or multi-modal device.

Method For Directional Focus Navigation

Directional focus navigation may be described in the general context of computer-executable instructions, such as application modules, being executed by a computer. Generally, application modules include routines, programs, objects, components, data structures, etc. that perform particular tasks or implement particular abstract data types. Directional focus navigation may be implemented using any number of programming techniques and may be implemented in local computing environments or in distributed computing environments where tasks are performed by remote processing devices that are linked through various communications networks based on any number of communication protocols. In such a distributed computing environment, application modules may be located in both local and remote computer storage media including memory storage devices.

Figure 1A:
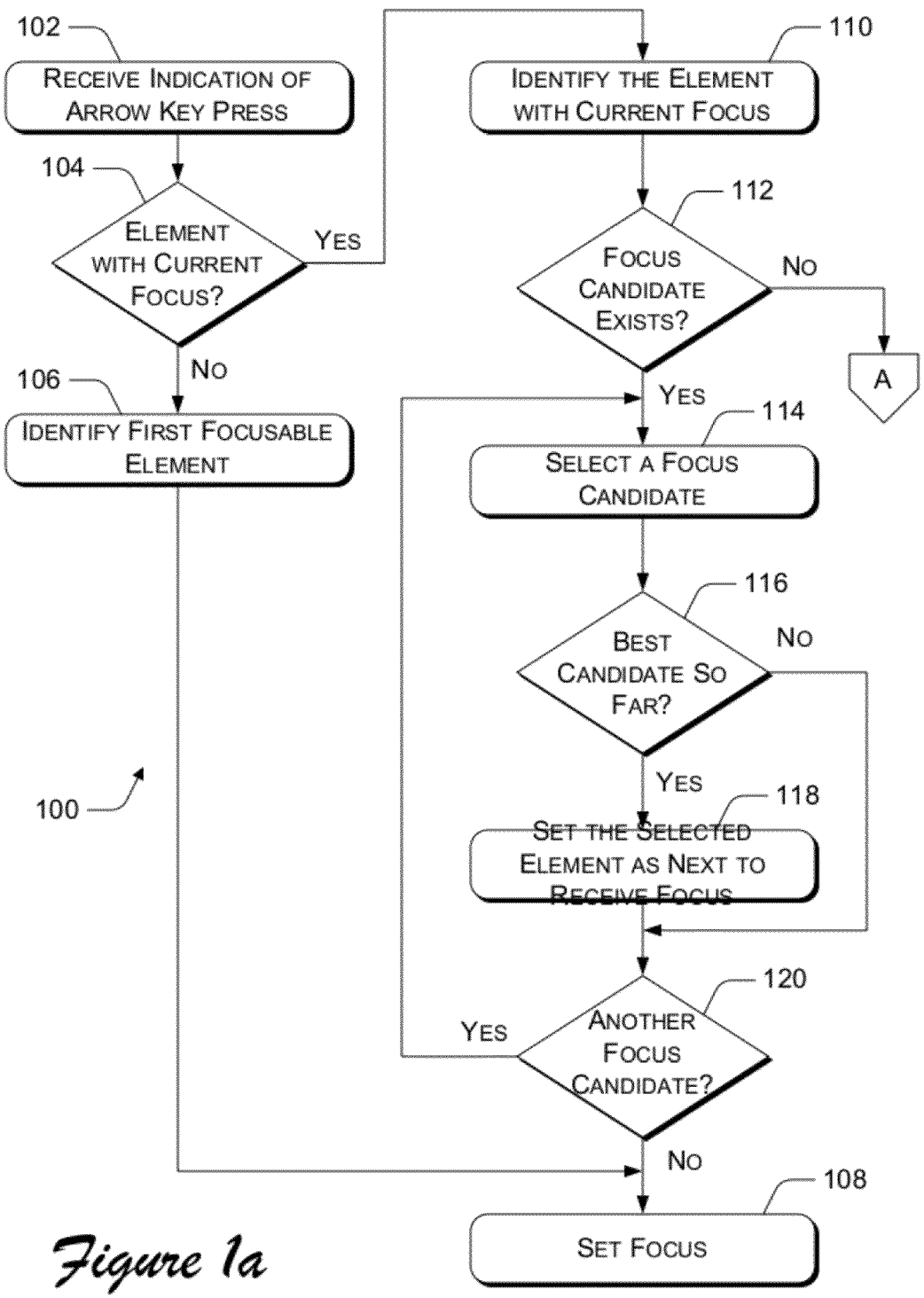
FIG. 1a illustrates a portion of an exemplary method for implementing directional focus navigation.
Figure 1B:
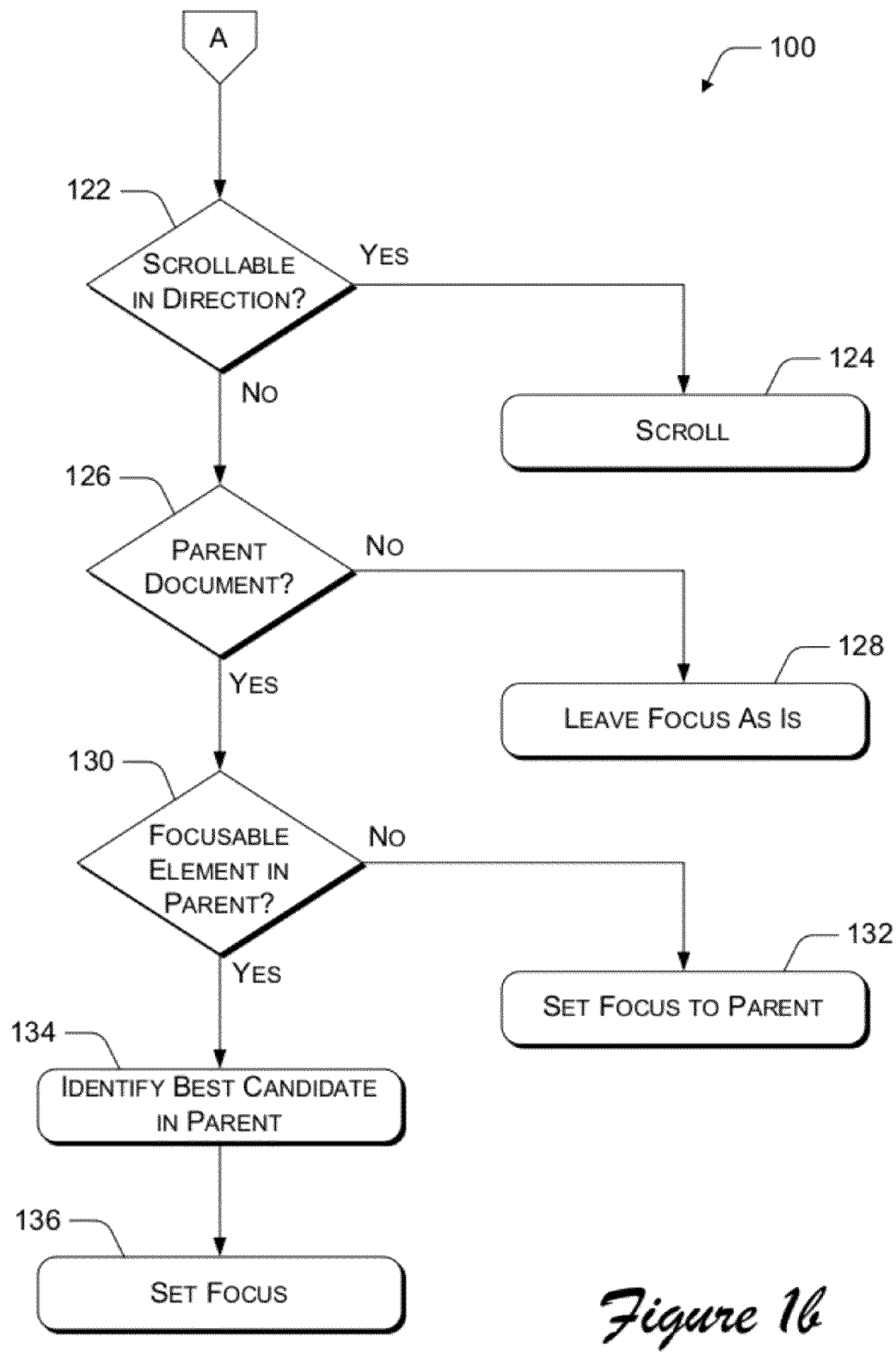
FIG. 1b illustrates a portion of an exemplary method for implementing directional focus navigation.

FIGS. 1a and 1b illustrate a method 100 for implementing directional focus navigation among focusable elements and/or focusable areas of a rendered document. FIG. 1a illustrates a portion of the method 100 that pertains to directional focus navigation when candidate focusable elements are within a display area associated with a document. FIG. 1b illustrates a portion of the method 100 that pertains to directional focus navigation when candidate focusable elements are not within a display area associated with a document.

Documents that may be rendered as described herein can be represented by a hierarchical tree structure that illustrates the relationships between elements of the document. For example, the document itself may be represented by an element (e.g., an HTML document element) that contains the other elements of the document, such as buttons, hyperlinks, tables, and so on. Per the hierarchical structure, elements within the document element may also contain other elements. For example, a table element may contain cell elements. When a document is first rendered, the focus is given to some element associated with the document. That element may be the document element, or it may be any other focusable element contained within the document element At block 102, a browser (or other type of rendering application) receives an indication of a directional input. For example, the indication is received when a user presses an arrow key (e.g., up, down, left, or right) on a keyboard, remote control, phone keypad, or other such device.

At block 104 the browser determines whether or not the current focus is on an element associated with the currently rendered document. If the browser determines that the current focus is not on an element associated with the document (the "No" branch from block 104), then at block 106 the browser identifies the first focusable element. The method continues at block 108, setting the focus to the identified first focusable element. In the described implementation, the first focusable element of a document is a focusable element that is a child of the element representing the entire document that is displayed above and to the left of any other focusable elements that are children of the element representing the entire document.

If the browser determines that there is a currently focused element associated with the document (the "Yes" branch from block 104), then at block 110, the browser identifies the element that currently has the focus.

At block 112 the browser determines whether a focus candidate exists. In the described implementation, a focus candidate is a focusable element that is within the viewable area of the document and displayed at a location that is indicated by the received directional input in relation to the display location of the currently focused element. If it is determined that there is not a focus candidate associated with the current document (the "No" branch from block 112), then the method continues at block 122 (shown in FIG. 1b). On the other hand, if it is determined that there is a focus candidate associated with the current document (the "Yes" branch from block 112), then the method continues at block 114.

At block 114 the browser selects a focus candidate that is associated with the current document.

At block 116 the browser determines whether or not the selected element is the most appropriate element to receive the focus based on the display location of the selected element in relation to the display location of the element that currently has the focus. If the selected element is an appropriate element to receive the focus based on its display location, and no other focusable element has been identified as an appropriate element, then the selected element is identified as the most appropriate element thus far. If the selected element is an appropriate element to receive the focus based on its display location, and another focusable element has previously been identified as the most appropriate element thus far, then the browser compares the locations of the two identified appropriate elements to determine which one is the most appropriate element thus far. If the browser determines that the selected element is the most appropriate element to receive the focus (the "Yes" branch from block 116), then the method continues at block 118. On the other hand, if the browser determines that the selected element is not the most appropriate element to receive the focus (the "No" branch from block 116), then the method continues at block 120.

At block 118, the browser identifies the selected element as the element to which the focus will be given.

At block 120 the browser determines whether or not there is another focusable element within the viewable area of the document that has not been selected as described with reference to block 114. If the browser determines that there is another focusable element that has not been selected (the "Yes" branch from block 120), then the method continues at block 114, as described above. On the other hand, if the browser determines that there are no other focusable elements that have not been selected (the "No" branch from block 120), then the method continues at block 108, setting the current focus to the focusable element identified as described above with reference to block 118.

As described above with reference to block 112, if the browser determines that there is not another focusable element within the viewable area of the document, then at block 122 (shown in FIG. 1b), the browser determines whether or not the current document is scrollable in the direction indicated by the received directional input (described above with reference to block 102). If the document is scrollable in the direction indicated (the "Yes" branch from block 122), then at block 124 the browser scrolls the document in the direction indicated. On the other hand, if the document is not scrollable in the direction indicated (the "No" branch from block 122), then the method continues at block 126.

At block 126 the browser determines whether the document associated with currently focused element is a child document associated with another parent document. If the browser determines that there is not a parent document (the "No" branch from block 126), then at block 128, the method terminates with the focus remaining on the currently focused element. On the other hand, if the browser determines that there is a parent document (the "Yes" branch from block 126), then the method continues at block 130.

At block 130 the browser determines whether there are focusable elements within the viewable area of the parent document that are appropriate based on the display location of the elements in relation to the display location of the element with the current focus based on the direction indicated by the directional input. If there are no appropriate focusable elements within the viewable area of the parent (the "No" branch from block 130), then at block 132 the browser sets the focus to the parent document. On the other hand, if there is at least one appropriate focusable element within the viewable area of the parent document (the "Yes" branch from block 130), the method continues at block 134.

At block 134 the browser identifies the most appropriate focusable element in the parent document to receive the focus.

At block 136 the browser sets the current focus to the element identified as described with reference to block 134.

Horizontal Focus Navigation

Horizontal focus navigation pertains to the moving of focus from one element to another element in response to a left or right directional input. In an implementation of directional focus navigation, when moving focus horizontally, preference is given to a focusable element with a display position that has more vertical overlap with the display position of the currently focused element over a focusable element that has less vertical overlap with the display position of the currently focused element. Details of a horizontal focus navigation implementation will be described below with reference to FIG. 2.

Right Directional Input

Figure 2:
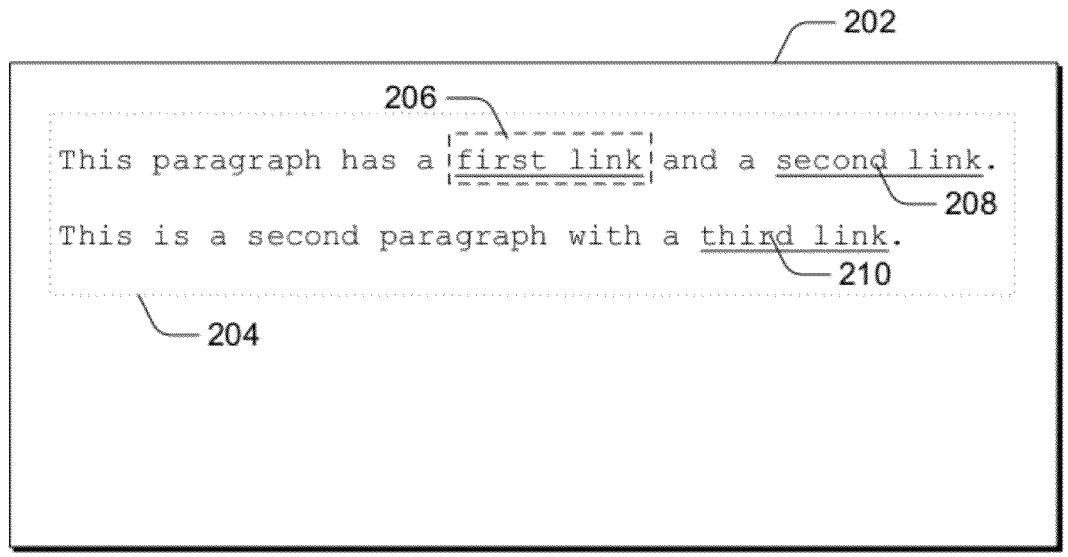
FIG. 2 illustrates a view of a document with three focusable elements.

FIG. 2 illustrates a view of a document that includes three focusable elements. Box 202 represents the viewable area supported by a rendering engine. Box 204 represents the document. Hyperlink 206 is the element that currently has the focus (indicated by the dashed box). When the rendering engine receives a right directional input (e.g., a user presses a right arrow key), the rendering engine determines which, if any, of the other focusable elements (i.e., hyperlink 208 or hyperlink 210) is the most appropriate element to receive the focus next. (This process is described above with reference to blocks 102-120 shown in FIG. 1*a*.)

The following mathematical definitions will be used below in horizontal focus navigation equations that may be used in an implementation of a rendering engine that supports directional focus navigation:

F=element that has the current focus
E=focusable element that is being evaluated
W=focusable element that is currently identified as the most appropriate focusable element to receive the focus so far
x.left=the left coordinate of the display location of element x
x.right=the right coordinate of the display location of element x
x.top=the top coordinate of the display location of element x
x.bottom=the bottom coordinate of the display location of element x
x.width=x.right−x.left
x.height=x.bottom−x.top
x.mid=x.left+(x.width)/2
x.vertoverlap=min(z, x.height, F.height), where:
  z=min(x.bottom−F.top, F.bottom−x.top)
x.%vertoverlap=(x.vertoverlap)/(x.height)

The above (and all following) equations are written using the assumption that the display area can be mapped to a two-dimensional grid in which the upper-left-most corner has (x, y) coordinates (0, 0).

If a focusable element E meets the following criteria, then E is considered a focus candidate (an appropriate element to receive focus) when the directional input indicates moving focus to the right:

E is within the displayable area of the document.
E.mid>F.mid
  (The midpoint of E is to the right of the midpoint of F.)
(F.bottom−E.bottom)<=LaxHeight1 OR
  (F.top−E.top)<=LaxHeight1, where LaxHeight1 is a configurable tolerance value used to compare the vertical display locations of element E and element F. In the described implementation, LaxHeight1 is derived from F.height and E.height, such as LaxHeight1=(max(F.height, E.height))/4.
  (E is at the same level or below F, or E is above F by no more than LaxHeight1.)

Comparing the horizontal midpoints (E.mid>F.mid) provides a mechanism for handling the special case in which two focusable elements have overlapping display areas.

Given the document illustrated in FIG. 2, hyperlinks 208 and 210 both qualify as appropriate elements to receive focus when a right directional input is received while the current focus is on hyperlink 206.

As described above with reference to block 116 shown in FIG. 1, the browser compares the elements that qualify as appropriate elements to receive the focus to determine the most appropriate element to receive the focus. In this implementation, element E is determined to be the most appropriate element to receive the focus when a right directional input is received if any of the following is true:

E.vertoverlap>=0 AND W.vertoverlap<0
  (E vertically overlaps F, but W does not vertically overlap F.)
E.vertoverlap<0 AND W.vertoverlap<0 AND E.vertoverlap>W.vertoverlap
  (Neither E nor W vertically overlaps F, but E is vertically closer to F.)
abs(E.vertoverlap−W.vertoverlap)<=LaxHeight2 AND E.left<W.left, where LaxHeight2 is a configurable tolerance value used to compare the vertical overlap of E and W with respect to F. In the described implementation, LaxHeight2 is derived from the heights of each of the elements involved in the comparison, such as LaxHeight2=(min(F.height, E.height, W.height))/3.
  (E and W have similar overlap values, but E is horizontally closer to F.)
E.vertoverlap>(W.vertoverlap+LaxHeight2) AND ((E.left<W.left)
  (E has a greater vertical overlap and E is horizontally closer to F.)
E.vertoverlap>(W.vertoverlap+LaxHeight2) AND (E.%vertoverlap>W.%vertoverlap)
  (E has a greater vertical overlap and E has a greater percentage vertical overlap.)
(E.left<W.left) AND (E.%vertoverlap >W.%vertoverlap)
  (E is horizontally closer to F and E has a greater percentage vertical overlap.)

In this implementation, preference is given to an element that vertically overlaps the currently focused element because most documents have a visual layout that suggests reading the document first from left to right and then from top to bottom. In alternate implementations, the specific algorithm can be modified to support other document layouts. Given the calculations above, in the document shown in FIG. 2, hyperlink 208 is determined to be the most appropriate element to receive the focus in response to a right directional input when hyperlink 206 is the element that currently has the focus because although hyperlink 210 is horizontally closer to the currently focused element, hyperlink 208 vertically overlaps hyperlink 206 and hyperlink 210 does not vertically overlap hyperlink 206.

Left Directional Input

Similarly, if a focusable element E meets the following criteria, then E is considered an appropriate element to receive focus when the directional input indicates moving focus to the left:

E is within the displayable area of the document.

E.mid<F.mid (The midpoint of E is to the left of the midpoint of F.)

(E.bottom−F.bottom)<=LaxHeight1 OR (E.top−F.top)<=LaxHeight1, where LaxHeight1 is a configurable tolerance value used to compare the vertical display locations of element E and element F. In the described implementation, LaxHeight1 is derived from F.height and E.height, such as LaxHeight1=(max(F.height, E.height))/4.

(E is at the same level or above F, or E is below F by no more than LaxHeight1.)

Element E is determined to be the most appropriate element to receive the focus when compared to element W when a left directional input is received if any of the following is true:

E.vertoverlap>=0 AND W.vertoverlap<0

(E vertically overlaps F but W does not vertically overlap F.)

E.vertoverlap<0 AND W.vertoverlap<0 AND E.vertoverlap>W.vertoverlap (Neither E nor W vertically overlap F, but E is vertically closer to F)

abs(E.vertoverlap−W.vertoverlap)<=LaxHeight2 AND E.right>W.right, where LaxHeight2 is a configurable tolerance value used to compare the vertical overlap of E and W with respect to F. In the described implementation, LaxHeight2 is derived from the heights of each of the elements involved in this comparison, such as LaxHeight2=(min(F.height, E.height, W.height))/3.

(E and W have similar overlap values, but E is horizontally closer to F)

E.vertoverlap>(W.vertoverlap+LaxHeight2) AND ((E.right>W.right)

(E has a greater vertical overlap and E is horizontally closer to F.)

E.vertoverlap>(W.vertoverlap+LaxHeight2) AND (E.%vertoverlap>W.%vertoverlap)

(E has a greater vertical overlap and E has a greater percentage vertical overlap.)

(E.right>W.right) AND (E.%vertoverlap>W.%vertoverlap)

(E is horizontally closer to F and E has a greater percentage vertical overlap.)

Vertical Focus Navigation

Vertical focus navigation pertains to the moving of focus from one element to another element in response to an up or down directional input. In an implementation of directional focus navigation, when moving focus vertically, preference is first given to a focusable element that is structurally close to the element that currently has the focus. Preference is next given to a focusable element that has horizontal coordinates closest to the horizontal coordinates of the last element that got focus by means other than an up or down directional input.

Details of a vertical focus navigation implementation will be described below with reference to FIGS. 3 and 4.

Down Directional Input

Figure 3:
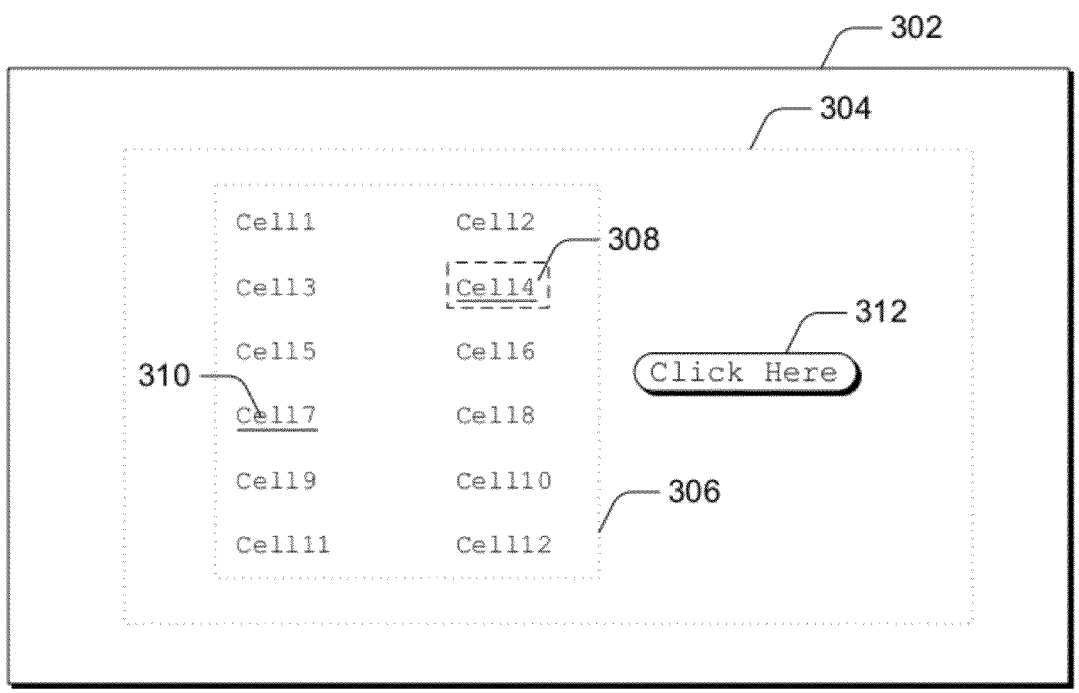
FIG. 3 illustrates a view of a document with several focusable elements and a table structure.

FIG. 3 illustrates a view of a document that includes several focusable elements, including a table structure. Box 302 represents the viewable area supported by the browser. Box 304 represents the document. Table 306 is table structure within document 304. Cell4 308 is the element that currently has the focus (indicated by the dashed box) and cell7 310 is another cell in table 306 that is also a focusable element. Button 312 is another focusable element within document 304 that is not within table structure 306.

Documents that can be rendered using a rendering engine can be defined in terms of hierarchical tree structure of elements. For example, the document 304 illustrated in FIG. 3, can be described in terms of a tree structure in which the document itself is the root element of the tree structure. Table 306 and button 312 are child elements of the root element. Cell4 308 and cell7 310 are focusable elements that are children of the table element in the tree structure.

When the rendering engine receives a down directional input (e.g., a user presses a down arrow key), the rendering engine determines which, if any, of the other focusable elements (i.e., hyperlink 310 or button 312) is the most appropriate element to receive the focus next. (This process is described above with reference to blocks 102-120 shown in FIG. 1a.)

The following mathematical definitions will be used below in vertical focus navigation equations that may be used in an implementation of a rendering engine that supports directional focus navigation:

F=element that has the current focus;

E=focusable element that is being evaluated;

W=focusable element that is currently identified as the most appropriate focusable element to receive the focus so far;

x.left=the left coordinate of the display location of element x;

x.right=the right coordinate of the display location of element x;

x.top=the top coordinate of the display location of element x;

x.bottom=the bottom coordinate of the display location of element x;

x.width=x.right−x.left;

x.height=x.bottom−x.top;

x.mid=x.top+(x.height)/2;

x.DistanceToCommonAncestor=the number of hierarchical levels, according to an element tree structure, between element x and the closest ancestor element that is common to both element x and element F;

CurrentLeft=the left coordinate of the last element that got focus by means other than an up or down directional input;

CurrentRight=the right coordinate of the last element that got focus by means other than an up or down directional input; and x.horizoverlap=min(x.right−CurrentLeft, CurrentRight−x.left).

The above (and all following) equations are written using the assumption that the display area can be mapped to a two-dimensional grid in which the upper-left-most corner has (x, y) coordinates (0, 0).

If a focusable element E meets the following criteria, then E is considered an appropriate element to receive focus when the directional input indicates moving focus down:

E is within the displayable area of the document;

(F.bottom−E.top)<LaxHeight3, where LaxHeight3 is a configurable tolerance value used to compare the vertical display locations of element E and element F. In the described implementation, LaxHeight3 is derived from F.height and E.height, such as LaxHeight3=(min (F.height, E.height))/4.

(E is lower than F or the top edge of E is above the bottom edge of F by no more than LaxHeight3.)

Given the document illustrated in FIG. 3, hyperlink 310 and button 312 both qualify as appropriate elements to receive focus when a down directional input is received while the focus is on hyperlink 308.

As described above with reference to block 116 shown in FIG. 1, the browser compares the elements that qualify as appropriate elements to receive the focus to determine the most appropriate element to receive the focus. In this implementation, element E is determined to be the most appropriate element to receive the focus when a down directional input is received if any of the following is true:

E.DistanceToCommonAncestor>W.DistanceToCommon Ancestor (E is structurally closer to F.)

(E.DistanceToCommonAncestor=W.DistanceToCommon Ancestor) AND (W.bottom−E.top>=compareHeight) AND (E.horizoverlap >W.horizoverlap), where compareHeight is a configurable tolerance value used to compare the vertical display locations of element E and element W. In the described implementation, compareHeight is derived from the heights of element E and element W, such as compareHeight=(min(E.height, W.height))/4.

(E is structurally equal to W, E is vertically closer to F (or the vertical distance between E and F is approximately equal to the vertical distance between W and F), and E has more horizontal overlap with the element that had focus when up/down navigation began than does W.)

(E.DistanceToCommonAncestor=W.DistanceToCommon Ancestor) AND (W.bottom−E.top>=compareHeight AND (W.width>=E.width) AND (W.left<=E.left), where compareHeight is a configurable tolerance value used to compare the vertical display locations of element E and element W. In the described implementation, compareHeight is derived from the heights of element E and element W, such as compareHeight=(min(E.height, W.height))/4.

(E is structurally equal to W, E is vertically closer to F (or the vertical distance between E and F is approximately equal to the vertical distance between W and F), and W horizontally contains E.)

(E.DistanceToCommonAncestor=W.DistanceToCommon Ancestor) AND (W.bottom−E.top>=compareHeight AND (E.width>=W.width) AND (E.left<=W.left), where compareHeight is a configurable tolerance value used to compare the vertical display locations of element E and element W. In the described implementation, compareHeight is derived from the heights of element E and element W, such as compareHeight=(min(E.height, W.height))/4.

(E is structurally equal to W, E is vertically closer to F (or the vertical distance between E and F is approximately equal to the vertical distance between W and F), and E horizontally contains W.)

(E.DistanceToCommonAncestor=W.DistanceToCommon Ancestor) AND (E.bottom<=W.top).

(E is structurally equal to W, and E is completely above W.)

In this implementation, preference is given first to an element that is structurally closer to the currently focused element, as defined by the tree structure that represents the document. If a decision between multiple focusable elements remains, preference is then given to an element that is horizontally closer to the element that had focus when up/down navigation began. Therefore, in the document shown in FIG. 3, hyperlinked Cell7 310 is determined to be the most appropriate element to receive the focus in response to a down directional input when hyperlinked Cell4 308 is the element that currently has the focus. Hyperlinked Cell7 310 is given preference because although focusable button 312 is vertically closer to hyperlink 308, hyperlinked Cell7 310 is structurally closer to hyperlinked Cell4 308 based on the element tree structure that represents document 304. That is, the common ancestor between hyperlink 308 and Cell7 310 (i.e., table 306) is closer to hyperlink 308 than the common ancestor between hyperlink 308 and button 312 (i.e., document 304) is to hyperlink 308. As a result, hyperlink 310 is selected as the next element to receive focus because it has the closest ancestor element in common with the currently focused element, according to an element tree structure that represents the document.

Figure 4:
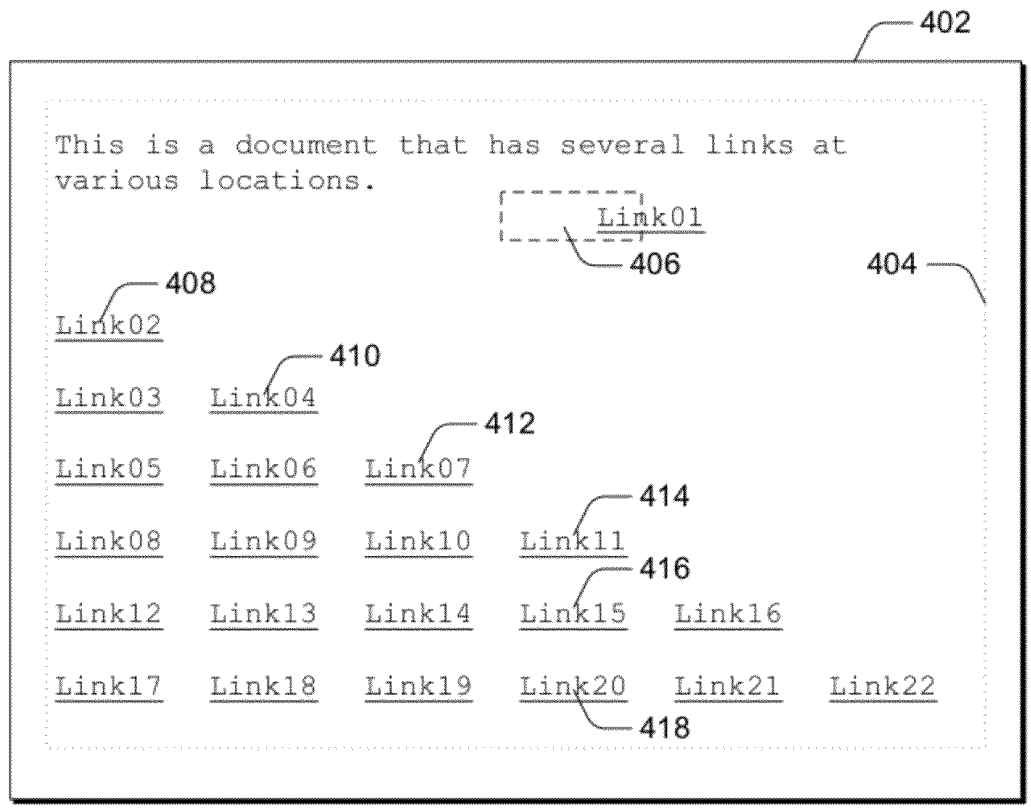
FIG. 4 illustrates a view of a document with several focusable elements.

FIG. 4 illustrates a view of a document that includes several focusable elements that are structurally equivalent based on an element tree structure representation of the elements in the document. For this discussion, it is assumed that hyperlink 406 is the element that currently has focus (indicated by the dashed line). Furthermore, it is assumed that hyperlink 406 received the focus based on something other than an up or down directional input. For example, hyperlink 406 may have been given the focus when the document was initially rendered or in response to a left or right directional input. When the rendering engine receives a down directional input (e.g., a user presses a down arrow key), the rendering engine determines, based on the equations described above, the most appropriate focusable element to receive the focus in response to the down directional input.

Link02-Link22 are all identified as appropriate elements to receive focus in response to the down directional input because each is within the focusable area of the document (indicated by box 402), the midpoint of each is below the midpoint of the currently focused element, and the top of each is below the bottom of the currently focused element.

When the focus is on element 406 and the rendering engine receives a down directional input, element 408 is given focus because it is vertically closer to the currently focused element 406 than any of the other elements that were determined appropriate for receiving focus.

When the focus is on element 408 and the rendering engine receives another down directional input, Link03-Link22 are all identified as appropriate elements to receive focus because they are below the currently focused element, 408. Because they are vertically closer to the currently focused element, Link03 and Link 04 are given preference. To decide between Link03 and Link04, the rendering engine compares the horizontal location of each with the horizontal location of the element that had focus when the up/down navigation began, which is hyperlink 406. Because Link04 is horizontally closer to hyperlink 406 than is Link03, hyperlink 410 (Link04) is given the focus in response to a down directional input received when the focus is on hyperlink 408.

Similarly, when the focus is on element 410 and the rendering engine receives another down directional input, Link05-Link22 are all identified as appropriate elements to receive focus because they are below the currently focused element, 410. Because they are vertically closer to the currently focused element, Link05-Link 07 are given preference. To decide between Link05, Link06, and Link07, the rendering engine compares the horizontal location of each with the horizontal location of the element that had focus when the up/down navigation began, which is hyperlink 406. Because Link07 is horizontally closer to hyperlink 406 than are Link05 or Link06, hyperlink 412 (Link07) is given the focus in response to a down directional input received when the focus is on hyperlink 410.

By the same rationale, if the rendering engine receives another down directional input while focus is on element 412, focus will move to element 414. When focus is on element 414 and the rendering engine receives another directional input, focus moves to element 416. Finally, when focus is on element 414 and the rendering engine receives another down directional input, focus move to element 418.

Up Directional Input

Similarly, if a focusable element E meets the following criteria, then E is considered an appropriate element to receive focus when the directional input indicates moving focus up:

E is within the displayable area of the document;

(E.bottom−F.top)<LaxHeight3, where LaxHeight3 is a configurable tolerance value used to compare the vertical display locations of element E and element F. In the described implementation, LaxHeight3 is derived from the heights of element E and element F, such as LaxHeight3=(min(F.height, E.height))/4.

(E is above F or the lower edge of E is below the top edge of F by no more than LaxHeight3.)

Element E is determined to be the most appropriate element to receive the focus when an up directional input is received if any of the following is true:

E.DistanceToCommonAncestor>W. DistanceToCommonAncestor (E is structurally closer to F.)

(E.DistanceToCommonAncestor=W.DistanceToCommonAncestor) AND (E.bottom−W.top>=compareHeight) AND (E.horizoverlap>W.horizoverlap), where compareHeight is a configurable tolerance value used to compare the vertical display locations of element E and element W. In the described implementation, compareHeight is derived from the heights of element E and element W, such as compareHeight=(min(E.height, W.height))/4.

(E is structurally equal to W, E is vertically closer to F (or the vertical distance between E and F is approximately equal to the vertical distance between W and F), and E has more horizontal overlap with the element that had focus when up/down navigation began than does W.)

(E.DistanceToCommonAncestor=W.DistanceToCommonAncestor) AND (E.bottom−W.top>=compareHeight) AND (W.width>=E.width) AND (W.left<=E.left), where compareHeight is a configurable tolerance value used to compare the vertical display locations of element E and element W. In the described implementation, compareHeight is derived from the heights of element E and element W, such as compareHeight=(min(E.height, W.height))/4.

(E is structurally equal to W, E is vertically closer to F (or the vertical distance between E and F is approximately equal to the vertical distance between W and F), and W horizontally contains E.)

(E.DistanceToCommonAncestor=W.DistanceToCommonAncestor) AND (E.bottom−W.top>=compareHeight) AND (E.width>=W.width) AND (E.left<=W.left), where compareHeight is a configurable tolerance value used to compare the vertical display locations of element E and element W. In the described implementation, compareHeight is derived from the heights of element E and element W, such as compareHeight=(min(E.height, W.height))/4.

(E is structurally equal to W, E is vertically closer to F (or the vertical distance between E and F is approximately equal to the vertical distance between W and F), and E horizontally contains W.)

(E.DistanceToCommonAncestor=W.DistanceToCommonAncestor) AND (E.top>=W.bottom).

(E is structurally equal to W, and E is completely below W.)

Directional Focus Navigation Among Focusable Areas

Figure 5:
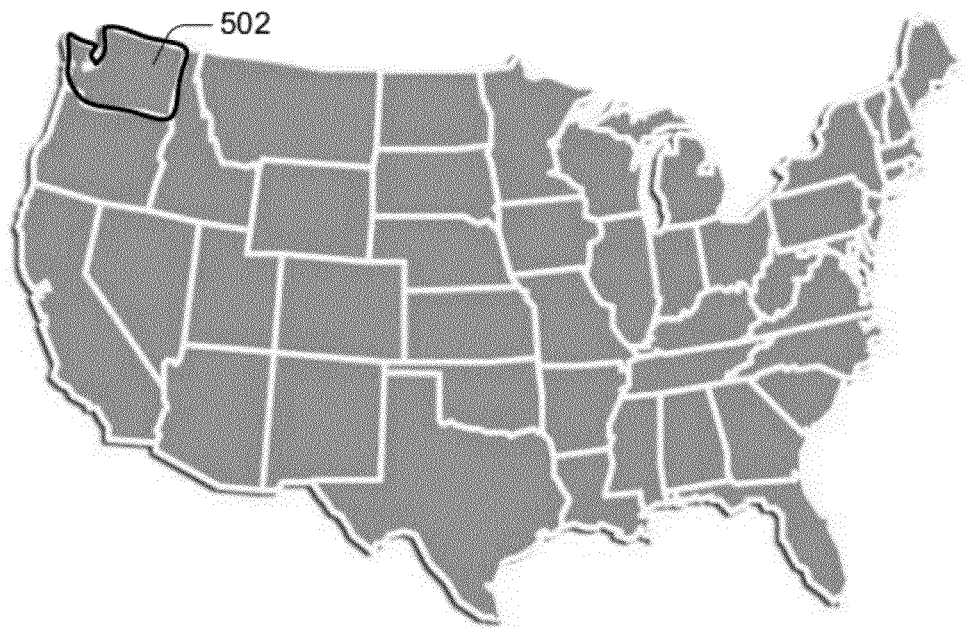
FIG. 5 illustrates a view of a document that includes focusable areas.

A rendering engine as described herein can be implemented to support directional focus navigation across arbitrarily shaped areas, such as areas defined for an image map. FIG. 5 illustrates a rendered view of a document that includes an image map of the United States of America in which each state is a focusable area. Area 502 is the area that currently has the focus (indicated by the solid outline). When the rendering engine receives a directional input (e.g., a user presses a right arrow key), the rendering engine determines which, if any, of the other focusable areas (i.e., the other focusable areas in the image map) is the most appropriate area to receive the focus next. (This process is described above with reference to blocks 102-120 shown in FIG. 1*a*.)

The following mathematical definitions will be used below in focus navigation equations that may be used in an implementation of a rendering engine that supports directional focus navigation across areas of arbitrary shape:

F=area that has the current focus

E=focusable area that is being evaluated

W=focusable area that is currently identified as the most appropriate focusable area to receive the focus so far x.left=the left coordinate of the left-most point of area x x.right=the right coordinate of the right-most point of area x x.top=the top coordinate of the top-most point of area x x.bottom=the bottom coordinate of bottom-most point of area x x.width=x.right−x.left x.height=x.bottom−x.top The above (and all following) equations are written using the assumption that the display area can be mapped to a two-dimensional grid in which the upper-left-most corner has (x, y) coordinates (0, 0).

Right Directional Input

If a focusable area E meets the following criteria, then E is considered an appropriate area to receive focus when the directional input indicates moving focus to the right:

E is within the displayable area of the document.

E.right−F.right>=LaxWidth, where LaxWidth is a configurable tolerance value used to compare the horizontal display locations of element E and element F. In the described implementation, LaxWidth is derived from the widths of element E and element F, such as LaxWidth=(min(E.width, F.width))/5.

(The right-most point of E is to the right of the right-most point of F by a distance of at least LaxWidth.)

As described above with reference to block 116 shown in FIG. 1, the browser compares the elements (or areas) that qualify as appropriate elements (or areas) to receive the focus to determine the most appropriate element (or area) to receive the focus. In this implementation, area E is determined to be the most appropriate area to receive the focus when a right directional input is received if the distance between a representative point of E and a representative point of F is shorter than the distance between the representative point of F and any of the other appropriate elements or areas to receive focus.

In the described implementation, the representative point of an area has a horizontal coordinate and a vertical coordinate. In one implementation, the horizontal coordinate of the representative point of an area is the average of the horizontal coordinates of all of the points of the area, while the vertical coordinate of the representative point is the average of the vertical coordinates of all of the points of the area. In an alternate implementation, the representative point of an area may be the midpoint of a particular side of the area. Although the described implementation suggests representative points that are calculated as average points, it is recognized that any number of methods and/or calculations may be used to determine a representative point associated with an area.

Left Directional Input

If a focusable area E meets the following criteria, then E is considered an appropriate area to receive focus when the directional input indicates moving focus to the left:

E is within the displayable area of the document.

F.left−E.left>=LaxWidth, where LaxWidth is a configurable tolerance value used to compare the horizontal display locations of element E and element F. In the described implementation, LaxWidth is derived from the widths of the element E and element F, such as LaxWidth=(min(E.width, F.width))/5.

(The left-most point of E is to the left of the left-most point of F by a distance of at least LaxWidth.)

In this implementation, area E is determined to be the most appropriate area to receive the focus when a left directional input is received if the distance between the representative point of E and the representative point of F is shorter than the distance between the representative point of F and any of the other appropriate elements or areas to receive focus.

Down Directional Input

If a focusable area E meets the following criteria, then E is considered an appropriate area to receive focus when the directional input indicates moving focus down:

E is within the displayable area of the document.

E.bottom−F.bottom>=LaxHeight, where LaxHeight is a configurable tolerance value used to compare the vertical display locations of element E and element F. In the described implementation, LaxHeight is derived from the heights of element E and element F, such as LaxHeight=(min(E.height, F.height))/4.

(The bottom-most point of E is below the bottom-most point of F by a distance of at least LaxHeight.)

As described above with reference to block 116 shown in FIG. 1, the browser compares the elements (or areas) that qualify as appropriate elements (or areas) to receive the focus to determine the most appropriate element (or area) to receive the focus. Similar to the implementation described above for horizontal focus navigation across arbitrarily shaped areas, area E is determined to be the most appropriate area to receive the focus when a down directional input is received if the distance between the representative point of E and a vertical representative point of F is shorter than the distance between the vertical representative point of F and any of the other appropriate elements or areas to receive focus.

In the described implementation, the representative point of an area, as described above, has a horizontal coordinate and a vertical coordinate. In the described implementation, when comparing focus candidates in response to vertical directional input (e.g., up or down), the horizontal component of the representative point of F is derived from the horizontal coordinate of the representative point of the element that had the focus when the first of the current sequence of up and/or down directional inputs was received.

By defining the horizontal coordinate of the vertical representative point of F in this way, priority is given to areas and/or elements that are horizontally closest to the area or element that had focus when a user first submitted an up or down directional input.

Up Directional Input

If a focusable area E meets the following criteria, then E is considered an appropriate area to receive focus when the directional input indicates moving focus up:

E is within the displayable area of the document.

F.top−E.top>=LaxHeight, where LaxHeight is a configurable tolerance value used to compare the vertical display locations of element E and element F. In the described implementation, LaxHeight is derived from the heights of element E and element F, such as LaxHeight=(min(E.height, F.height))/4.

(The top-most point of E is above the top-most point of F by a distance of at least LaxHeight.)

Area E is determined to be the most appropriate area to receive the focus when an up directional input is received if the distance between the representative point of E and a vertical representative point of F is shorter than the distance between the vertical representative point of F and any of the other appropriate elements or areas to receive focus.

Focus Navigation In Scrollable Documents

Figure 6A:
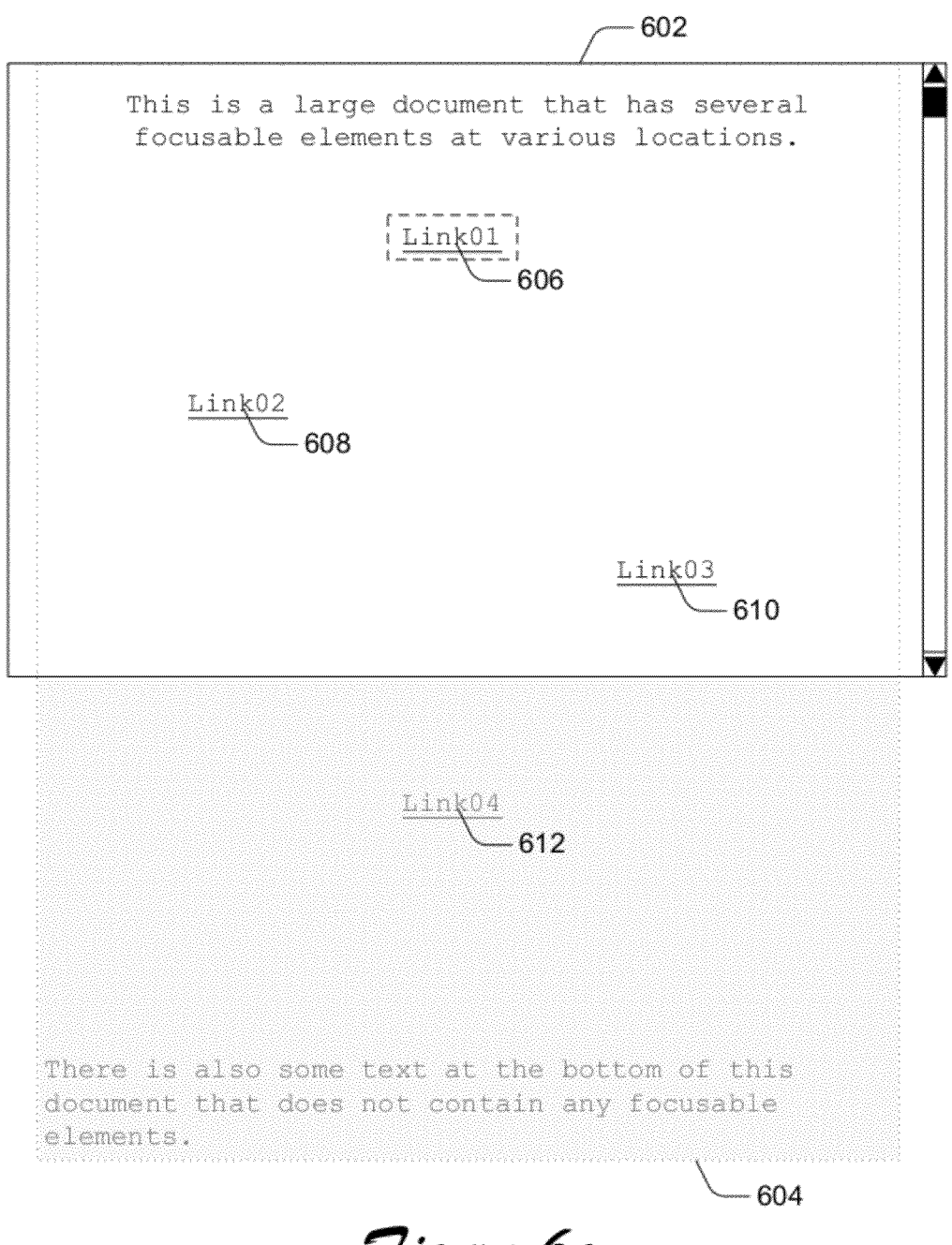
FIG. 6a illustrates a view of a scrollable document with several focusable elements.

FIG. 6a illustrates a scrollable document that includes focusable elements. Window 602 represents a display area, box 604 represents the document. The document 604 is vertically larger than the display area 602. To view portions of the document 604 that are outside of the display area 602, the document can be scrolled.

In typical browser implementations, in response to directional input (e.g., an arrow key press), if the document currently being rendered is scrollable, then the browser scrolls the document in the direction indicated by the directional input. In the described browser implementation that supports directional focus navigation, when directional input is received, the browser can move focus from one focusable element to another, as described above, or can cause the document to scroll in the direction indicated by the directional input.

In the example illustrated in FIG. 6a, if focus is initially on hyperlink 606 and the rendering engine receives a down directional input, focus is moved from hyperlink 606 to hyperlink 608. If the rendering engine receives another down directional input, focus moves from hyperlink 608 to hyperlink 610. If the rendering engine then receives another down directional input, focus does not move from hyperlink 610 because there is not another focusable element below hyperlink 610 and within the displayable area. Because there is not another focusable element below and within the displayable area, the browser scrolls the document based on the down directional input.

Figure 6B:
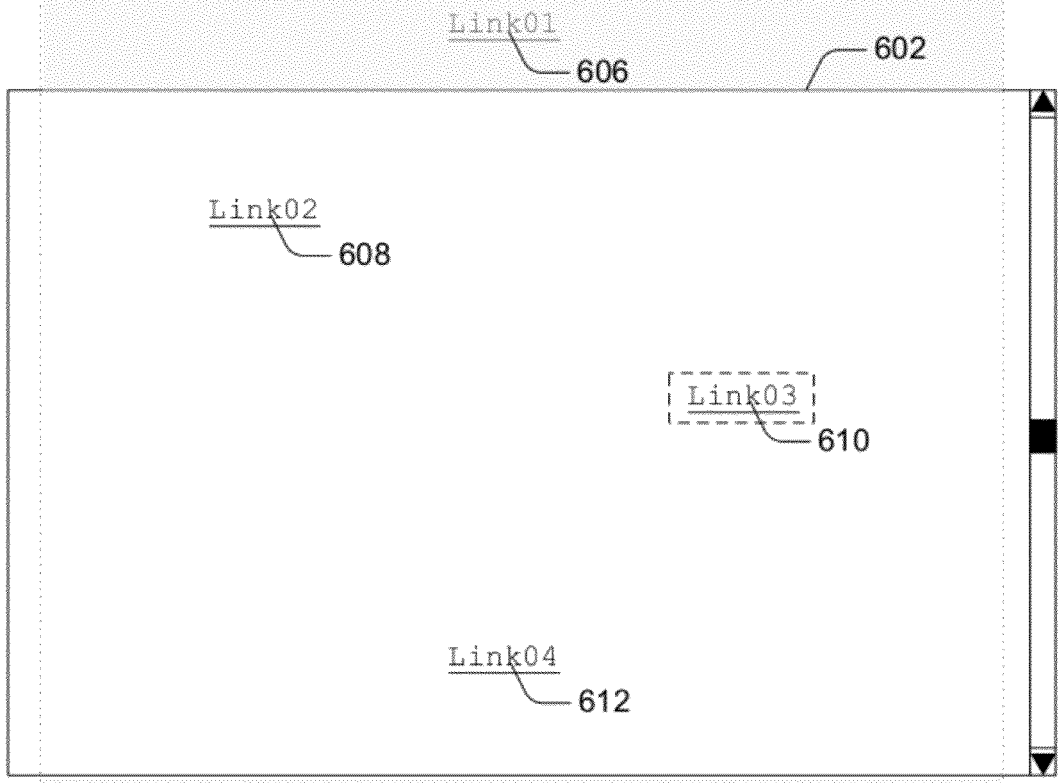
FIG. 6b illustrates a view of a scrollable document with several focusable elements.

FIG. 6b illustrates the scrollable document that is described above with respect to FIG. 6a, after the above-described down directional inputs are received by the browser and the browser has scrolled the document until hyperlink 612 is within the displayable area 602. If focus is on hyperlink 610 and the rendering engine receives another down directional input, then focus is moved to hyperlink 612. If the rendering engine then receives another down directional input, focus does not move from hyperlink 612 because there is not another focusable element below hyperlink 612 and within the displayable area. Because there is not another focusable element below and within the displayable area, the browser scrolls the document according to the directional input.

In an alternate implementation, in response to a directional input, the browser may both scroll and move focus. For example, if a browser receives a down directional input, and the only focus candidate element is located outside the viewable area, the browser may scroll the document in the down direction until the focus candidate is within the viewable area, and then move focus to that element.

Figure 6C:
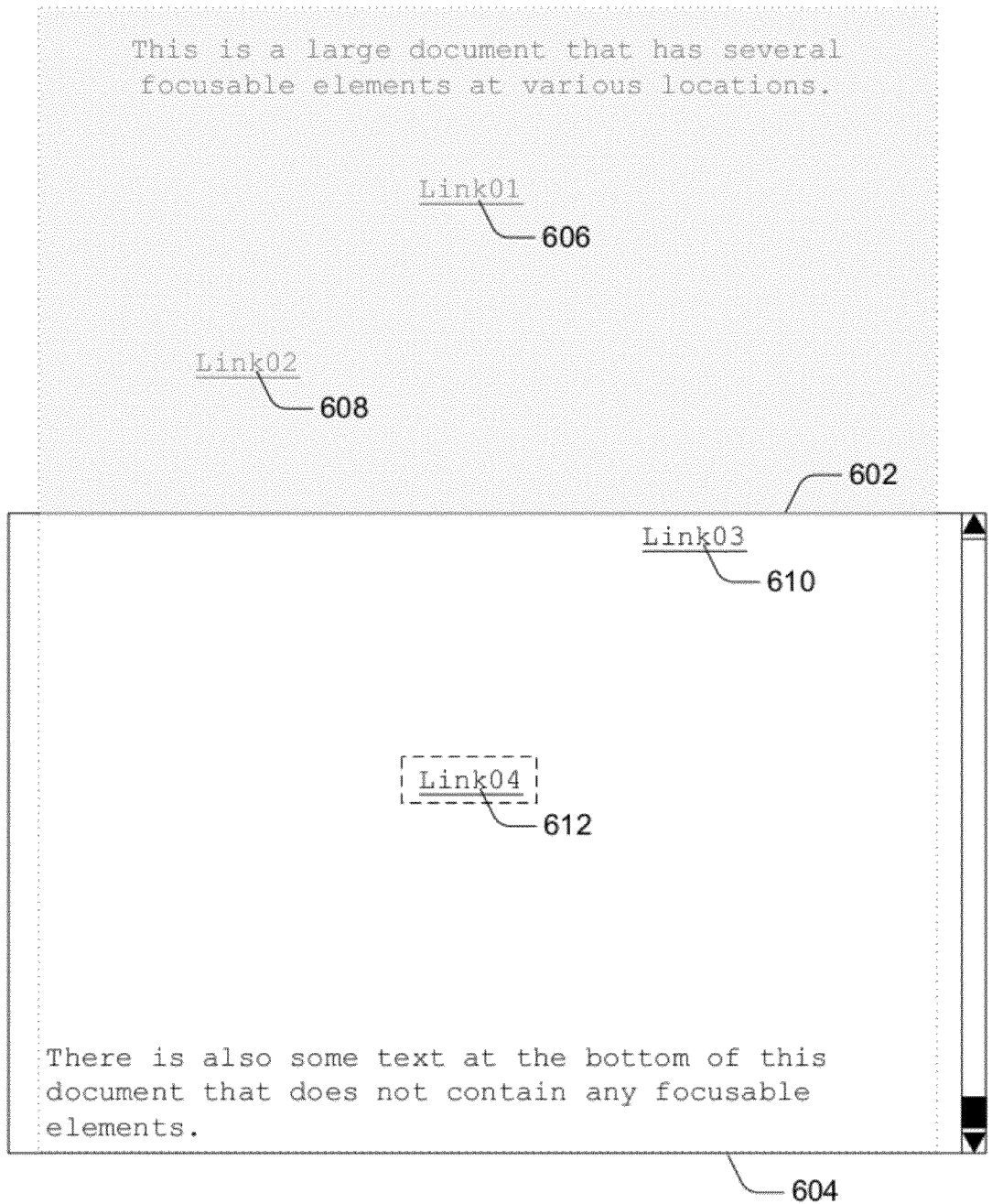
FIG. 6c illustrates a view of a scrollable document with several focusable elements.

FIG. 6c illustrates the scrollable document that is described above with respect to FIGS. 6a and 6b, after the above-described down directional inputs are received by the browser and the browser has scrolled the document until the lowermost point of the document is within the displayable area 602.

Figure 7A:
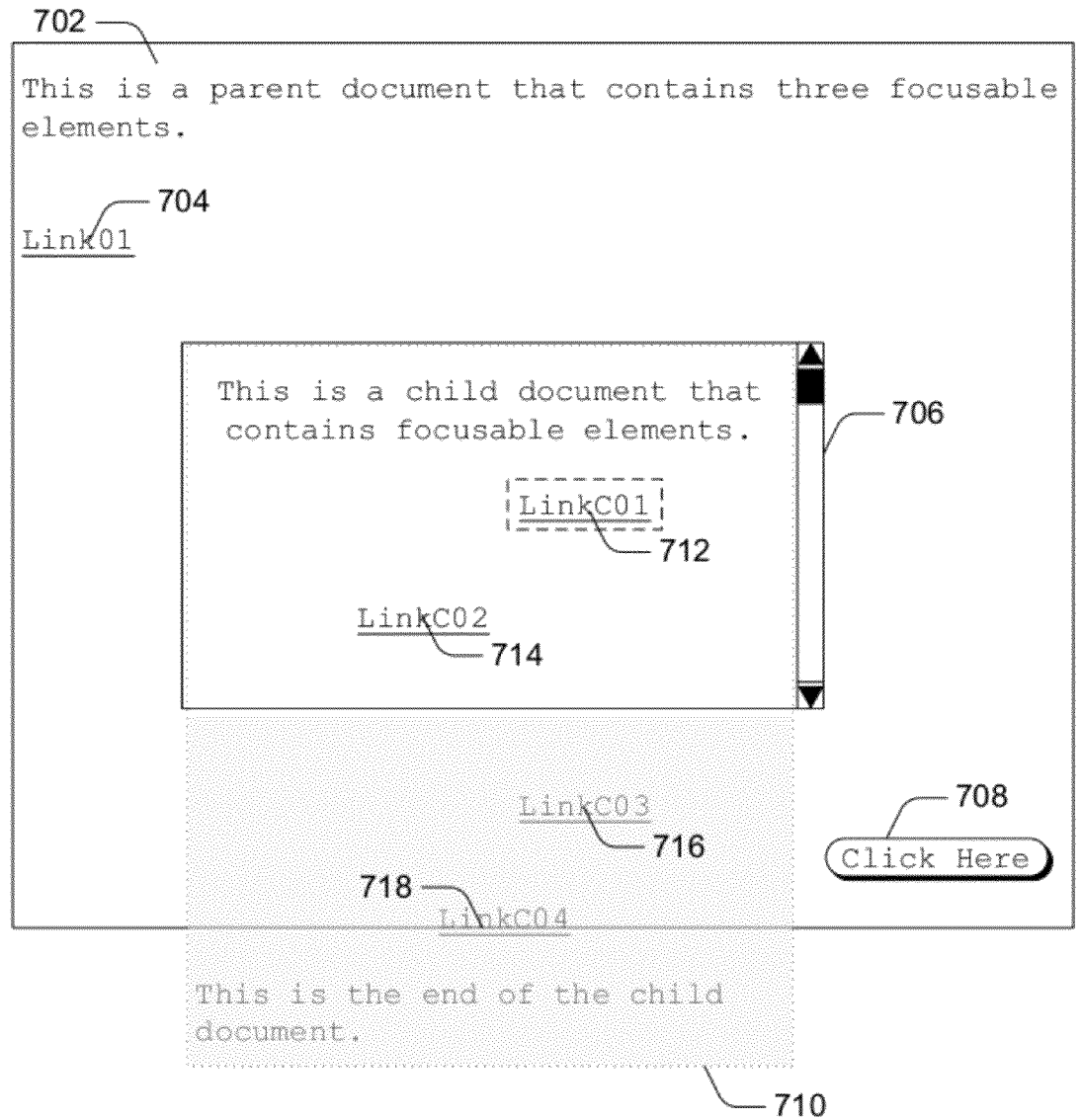
FIG. 7a illustrates a view of a parent document that includes a scrollable element.

FIG. 7a illustrates a document that includes focusable elements where one of the focusable elements is scrollable and contains other focusable elements. Document 702 includes focusable elements 704 (a hyperlink), 706 (a scrollable frame), and 708 (a button). Element 706 is representative of any scrollable element, which, in HTML, may include, but is not limited to, frame elements, object elements, div elements, and iframe elements. Document 710 is displayed in scrollable frame 706 and includes focusable elements 712, 714, 716, and 718 (all hyperlinks). Assuming in this example that the browser or rendering engine that is rendering document 702 receives several sequential down directional inputs. Assuming that focus is initially on hyperlink 702 (as indicated by the dashed line), when the browser receives the first down directional input, the browser identifies scrollable frame 706 as the most appropriate element to receive the focus. Because scrollable frame 706 includes focusable elements, the focus moves to the first identified focusable element in document 710, which is hyperlink 712.

When the browser receives a second down directional input, the focus moves to hyperlink 714.

When the browser receives a third down directional input, the focus remains on hyperlink 714 and the browser scrolls document 710. Depending on the amount that document 710 is scrolled, several down directional inputs may be received before 716 is scrolled into the displayable area (indicated by the boundaries of scrollable frame 706). Once 716 is within the displayable area, when another down directional input is received, focus moves to hyperlink 716.

A similar process of receiving down directional inputs and scrolling is repeated until hyperlink 718 is within the displayable area, and then in response to the next down directional input hyperlink 718 receives the focus.

Once hyperlink 718 has focus, additional down directional inputs will continue to scroll document 710 (while the focus remains on hyperlink 718) until the lowermost portion of document 710 is within the displayable area.

Figure 7B:
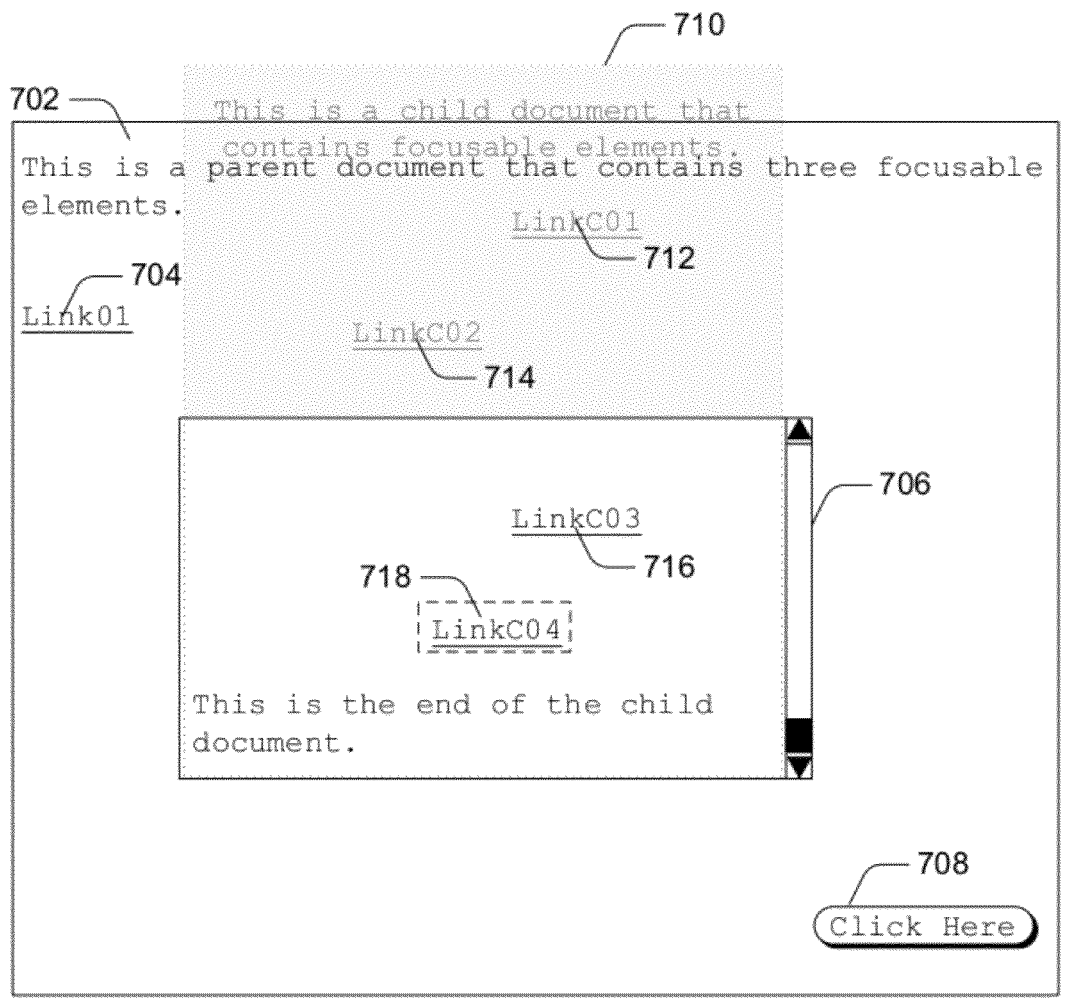
FIG. 7b illustrates a view of a parent document that includes a scrollable element.

FIG. 7b illustrates the visual state of document described with reference to FIG. 7a after the described down directional inputs are received and processed.

If the browser receives an additional down directional input, focus moves from hyperlink 718 to button 708. The browser determines that there is not another focusable element below hyperlink 718 and within the displayable area of document 710, and the browser determines that document 710 cannot be scrolled in the down direction any further. Accordingly, the browser identifies button 708 as the next focusable element below scrollable frame 706 in document 710.

Focus Navigation Between Frames

Figure 8:
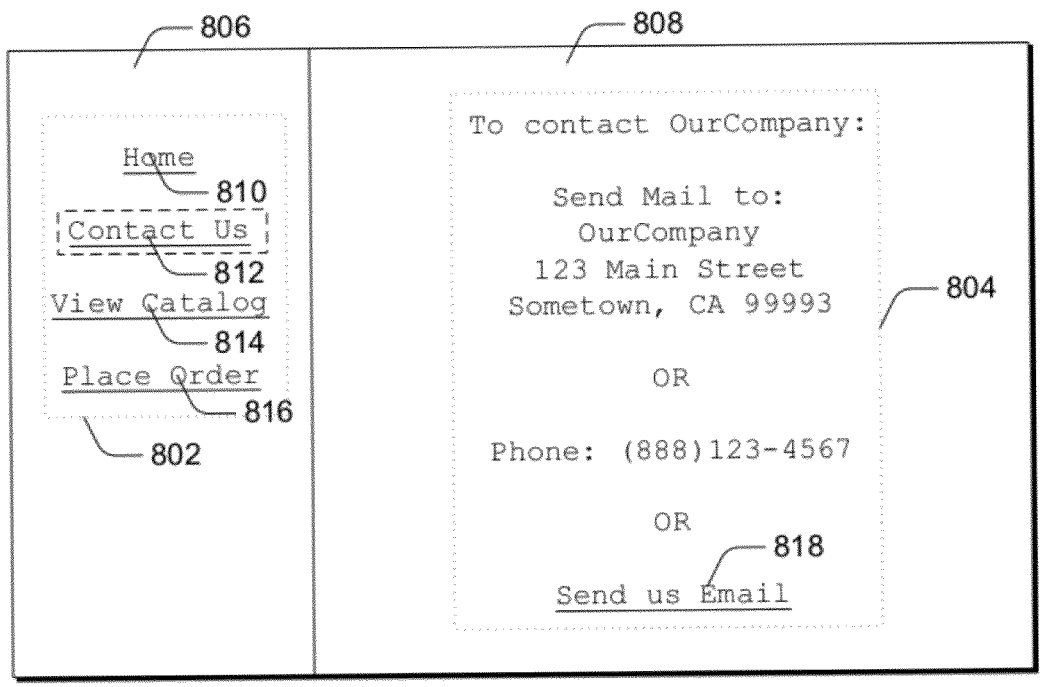
FIG. 8 illustrates a view of two documents with focusable elements displayed using frames.

FIG. 8 illustrates a rendered view of two documents that include focusable elements that are displayed using frames. Documents 802 and 804 are displayed in frames 806 and 808, respectively. Document 802 includes hyperlinks 810, 812, 814, and 816. Document 804 includes hyperlink 818.

If focus is on hyperlink 812 (as indicated by the dashed line) when a browser application that is rendering the document receives a down directional input, focus moves to hyperlink 814.

However, if focus is on hyperlink 812 when a browser application that is rendering the document receives a right directional input, focus moves to hyperlink 818 because even though it is associated with a different document, it is the first focusable element that has a display location that is to the right of hyperlink 812.

Allowing Standard Behavior In Focusable Elements

Some focusable elements may, as a standard, exhibit a particular behavior in response to directional input. For example, if a pop-up menu has focus and a user presses a down arrow key, the next element down in the menu may become highlighted, indicated that it is the currently selected menu item. As another example, if a text box has focus and a user presses a right arrow key, a cursor in the text box may shift one character to the right.

In the implementation described, the browser application is implemented to support directional focus navigation while allowing standard behavior in those focusable elements that may respond in and of themselves to directional input. To allow this behavior, the browser may be implemented such that when an element has focus, a user can send a "select" input to indicate that directional inputs from that point on are to be directed to the focused element. A subsequent "select" input can be used to indicate that directional inputs from that point are to be directed to the document in such a way that they drive focus navigation.

For example, when a pop-up menu element receives the focus, a user may press the Enter key (or other designated "select" input device) to select the pop-up menu as the element that will be affected by subsequent directional input. Once the user has navigated to the desired menu item, the user may press the Enter key again to indicate that a selection has been made and to signify to the browser that additional directional inputs will now drive focus navigation. To cancel a selection, the user may press the Escape key (or other designated "cancel" input device).

Exemplary Implementation

Figure 9:
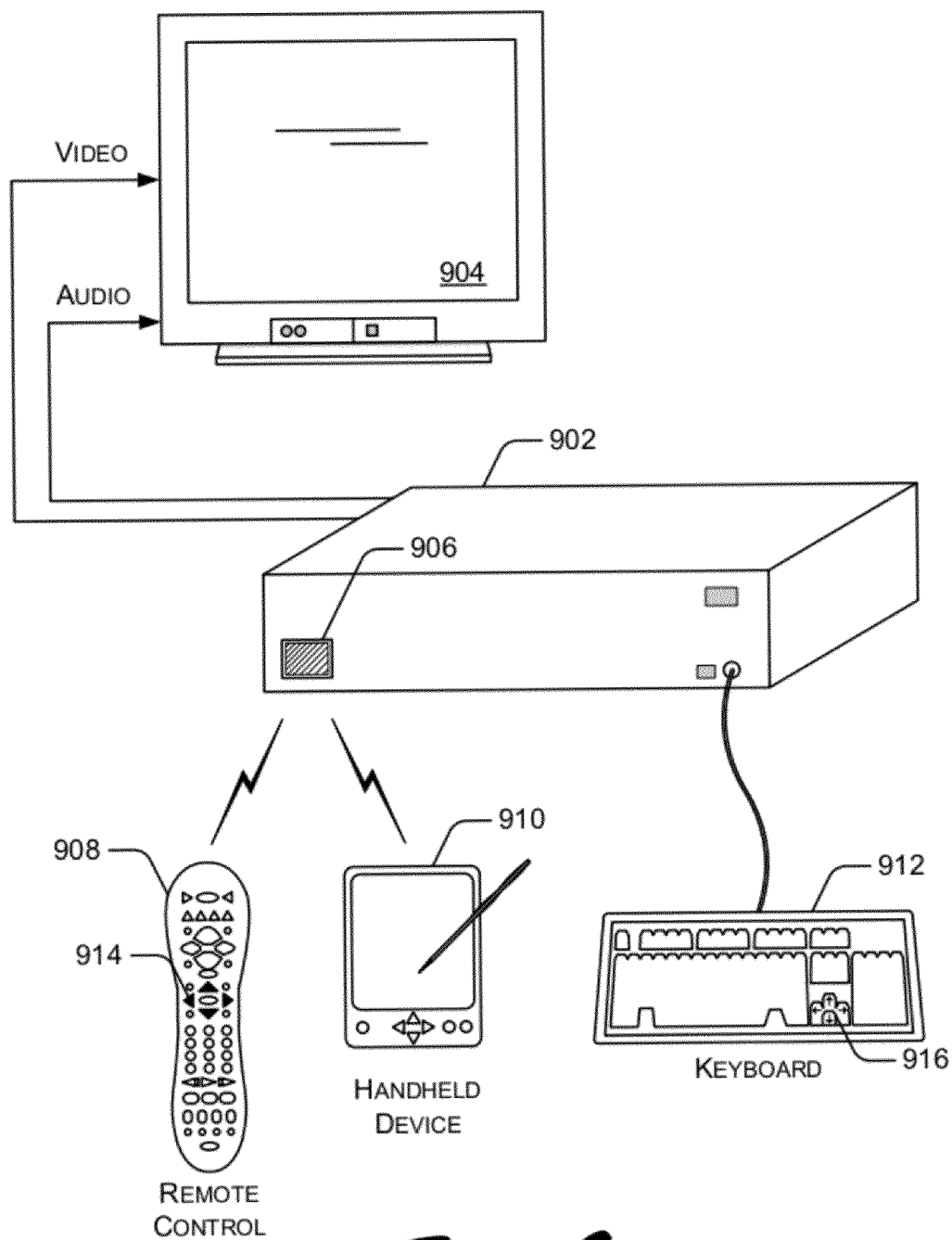
FIG. 9 illustrates components of an exemplary environment in which directional focus navigation may be implemented.

FIG. 9 is a block diagram of an example client device 902, display device 904, and various input devices that interact with the client device. Client device 902 may also be referred to as a set-top box, game console or a satellite receiver.

Client device 902 includes a wireless receiving port 906 (e.g., an infrared (IR) wireless port) for receiving wireless communications from a remote control device 908, a handheld device 910 (such as a personal digital assistant (PDA) or handheld computer), or other wireless device, such as a wireless keyboard. Additionally, a wired keyboard 912 is coupled to client device 902 for communicating with the client device. In alternate embodiments, remote control device 908, handheld device 910, and/or keyboard 912 may us an RF communication link (or other mode of transmission) to communicate with client device 902. In another alternate embodiment, client device 902, display device 904, and an input device may be implemented as a single hardware unit, such as a cellular telephone or as a handheld device similar to handheld device 910.

In the exemplary system described herein, directional inputs are provided by pressing keys arrow keys 914 of remote control 908, arrow keys or other inputs associated with handheld device 910, or arrow keys 916 of keyboard 912. Such keys might comprise four orthogonal direction keys (up, down, left, and right), or might allow movement in additional directions. Alternatively, a particular input device might utilize a joystick or similar mechanism for directional input, and such an input device might provide increased angular granularity as opposed to the four-direction granularity provided by four orthogonal direction keys.

Client device 902 includes a rendering engine for generating a video signal and/or an audio signal, both of which are communicated to display device 904. The video signals and audio signals can be communicated from client device 902 to display device 904 via an RF (radio frequency) link, S-video link, composite video link, component video link, or other communication link. Although not shown in FIG. 9, a particular client device 902 may include one or more lights or other indicators identifying the current status of the client device. Additionally, a particular client device 902 may include one or more control buttons or switches (not shown) for controlling operation of the client device.

Figure 10:
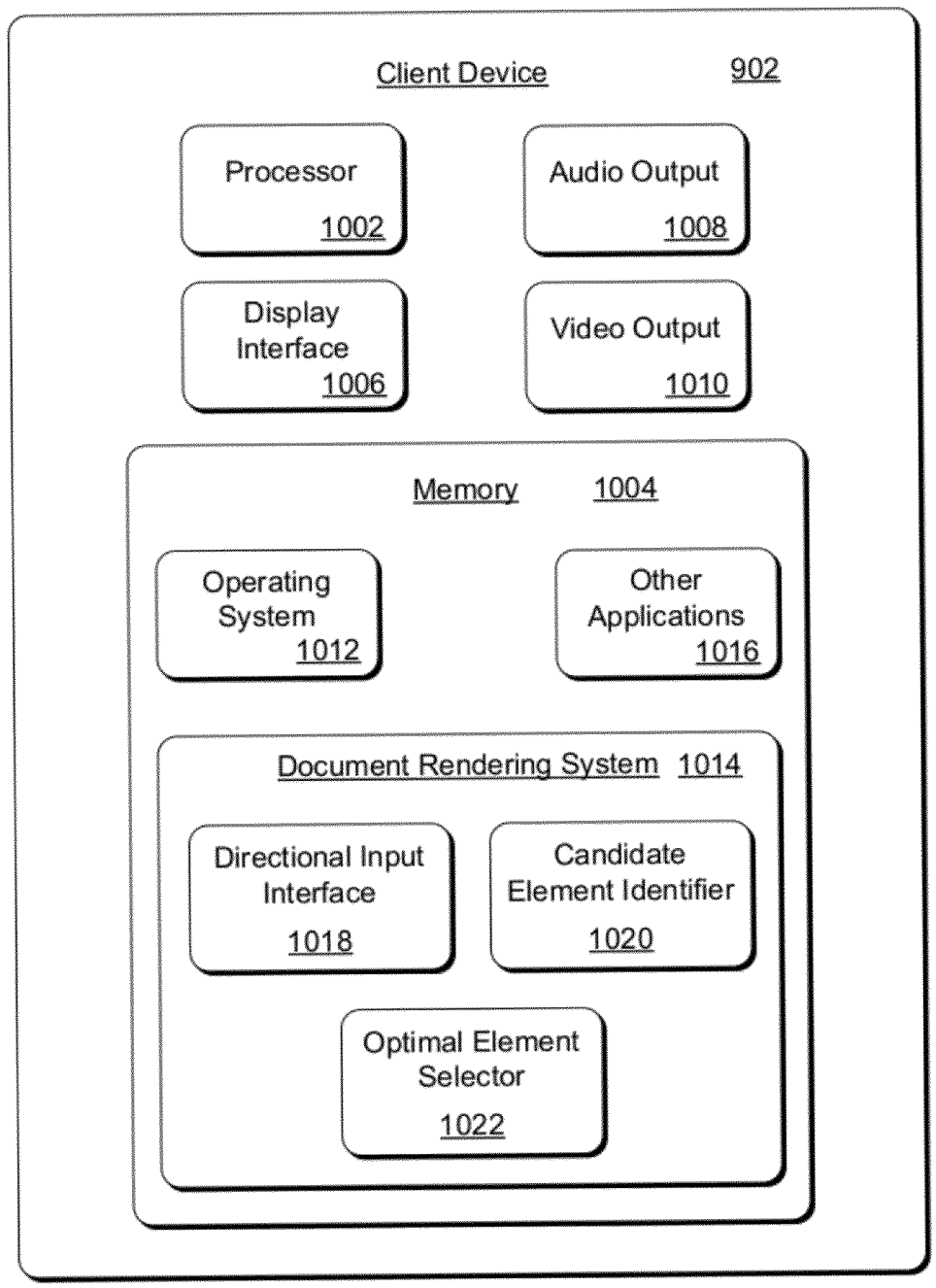
FIG. 10 illustrates select components of a client device implemented to support directional focus navigation.

FIG. 10 is a block diagram illustrating select components of a client device implemented to support directional focus navigation as described herein. Client device 902 may be implemented as, but is not limited to, a personal computer system, a cellular telephone, a personal multi-modal device, a television, or a television set-top box.

Client device 902 includes a processor 1002, a memory 1004, a display interface 1006, an audio output 1008, and a video output 1010. Operating system 1012, rendering engine 1014, and other applications 1016 are stored in memory 1004 and executed on processor 1002. Display interface 1006 provides a mechanism for client device 902 to display documents rendered by rendering engine 1014.

To support directional focus navigation, rendering engine 1014 includes directional input interface 1018 for receiving directional input, candidate element identifier 1020 for identifying focusable elements that may receive focus based on received directional input, and optimal element selector 1022 for selecting an optimal focusable element to receive focus when multiple candidate elements are selected based on received directional input.

Conclusion

Although the systems and methods have been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A method executed via one or more processors on a client device, the method comprising:
   identifying a first focusable element in a rendered document;
   receiving a first directional input;
   moving focus from the first focusable element to a second focusable element located in the rendered document based at least in part on a location of the first focusable element, a location of the second focusable element, and the first directional input,
   wherein subsequent to the moving focus from the first focusable element to the second focusable element, the first focusable element no longer has focus;
   receiving a second directional input sequential to the first directional input, the second directional input being a single input;
   identifying one or more candidate elements in response to receiving the second directional input; and
   moving the focus from the second focusable element to a third focusable element in the rendered document, the third focusable element being selected from the one or more candidate elements based at least in part on the location of the second focusable element, a distance relationship between a location of the third focusable element and the location of the first focusable element that no longer has focus, and the second directional input.

2. A method as described in claim 1, wherein moving the focus from the second focusable element to the third focusable element is further based on a relationship between the location of the third focusable element and the location of the second focusable element.

3. A method as described in claim 1, wherein the location of the second focusable element is along a direction indicated by the first directional input in relation to the location of the first focusable element.

4. A method as described in claim 1, wherein the rendered document is a scrollable document, and identifying the second focusable element comprises scrolling the rendered document until the second focusable element is within a displayable area.

5. A method as described in claim 3, wherein the location of the third focusable element is along another direction indicated by the second directional input and the direction indicated by the first directional input and the another direction indicated by the second directional input are a same direction.

6. A method as described in claim 5, wherein the same direction is a downward direction.

7. A method as described in claim 1, wherein the first focusable element is not one of the one or more candidate elements at least because the first focusable element is not located along a direction indicated by the second directional input.

8. A method as described in claim 1, further comprising:
   receiving a third directional input sequential to the first directional input and the second directional input; and
   moving the focus from the third focusable element to a fourth focusable element in the rendered document based at least in part on the location of the third focusable element, a distance relationship between a location of the fourth focusable element and the location of the first focusable element that no longer has focus, and the third directional input.

9. A method executed via one or more processors on a client device, the method comprising:
   determining a first element that currently has focus;
   receiving a first directional input corresponding to a first direction;
   identifying a second element located a distance along the first direction from the first element;
   moving focus from the first element that currently has focus to the second element,
   wherein after the moving, the first element no longer has focus;
   receiving a second directional input sequential to the first directional input, the second directional input corresponding to a second direction, wherein the second directional input is a single input;
   identifying a third element and a fourth element as candidate focusable elements based at least in part on the second directional input and a location of the second element;
   determining a first directional distance between a location of the first element and a location of the third element;

determining a second directional distance between the location of the first element and a location of the fourth element, wherein the second directional distance is shorter than the first directional distance; and moving the focus from the second element to the fourth element based at least in part on the second directional distance being shorter than the first directional distance.

10. A method as described in claim 9, wherein identifying the third element and the fourth element as candidate focusable elements is further based at least in part on a relationship between the locations of the third and fourth elements and the location of the second element.

11. A method as described in claim 9, wherein the first element, the second element, the third element, and the fourth element are displayed within a scrollable rendered document.

12. A method as described in claim 9, wherein the first element is not identified as one of the candidate focusable elements at least because the first element is not displayed along the second direction in accordance with the second directional input.

13. A method as described in claim 9, wherein the first direction and the second direction are both a downward direction.

14. One or more computer storage media storing instructions that, when executed by the one or more processors, direct the one or more processors to perform the method as described in claim 9.

15. One or more computer storage media storing instructions that, when executed by the one or more processors, direct a computing device to perform operations comprising:

determining a first element that currently has focus;

receiving a first directional input corresponding to a first direction;

identifying a second element located along the first direction;

moving the focus from the first element to the second element such that the first element no longer has focus;

receiving a second directional input sequential to the first directional input, the second directional input corresponding to a second direction, wherein the second directional input is a single input;

identifying a third element and a fourth element as candidate focusable elements based at least in part on the second directional input and proximity of the third element and the fourth element to the second element along the second direction;

determining a first distance between a location of the first element and a location of the third element along a direction perpendicular to the second direction;

determining a second distance between the location of the first element and a location of the fourth element along the direction perpendicular to the second direction, wherein the second distance is shorter than the first distance; and moving the focus from the second element to the fourth element based at least in part on the second distance being shorter than the first distance.

16. One or more computer storage media as described in claim 15, wherein the first element is not identified as one of the candidate focusable elements at least because the first element is not displayed along the second direction in accordance with the second directional input.

17. One or more computer storage media as described in claim 15, wherein the first direction and the second direction are both a downward direction.

* * * * *